(No Model.)
W. S. HOW.
DENTAL ABRADING OR CUTTING TOOL.
No. 522,211.    Patented July 3, 1894.
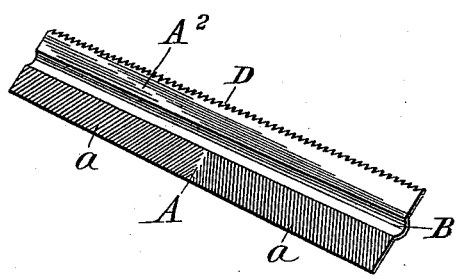
Witnesses:
Baltus DeLong.
[signature]
Inventor:
W. S. How
By atty
[signature]

UNITED STATES PATENT OFFICE.

WOODBURY STORER HOW, OF PHILADELPHIA, PENNSYLVANIA, ASSIGNOR TO THE S. S. WHITE DENTAL MANUFACTURING COMPANY, OF SAME PLACE.

DENTAL ABRADING OR CUTTING TOOL.

SPECIFICATION forming part of Letters Patent No. 522,211, dated July 3, 1894.

Application filed August 16, 1893. Serial No. 483,255. (No model.)

*To all whom it may concern:*

Be it known that I, WOODBURY STORER HOW, a citizen of the United States, residing at Philadelphia, in the county of Philadelphia and State of Pennsylvania, have invented certain new and useful Improvements in Abrading or Cutting Tools; and I do hereby declare the following to be a full, clear, and exact description of the invention, such as will enable others skilled in the art to which it appertains to make and use the same.

My invention relates to a certain improvement, as hereinafter claimed, in abrading and cutting tools, such as files and saws, made of thin sheet metal and adapted to be grasped by hand at either end for use; and my objects are to stiffen or impart rigidity to such tools and to so construct them as to provide stops or guides to limit or control their action.

The accompanying drawing shows in perspective a tool made in accordance with my invention.

The tool, as represented, is made of suitable sheet metal, as thin as desired, with file teeth $a$ $a$ in two groups or sets, one group on each side of the middle of the body or blade A of the tool, with the teeth of the respective groups inclined in opposite directions. The sheet metal is bent or corrugated to provide a longitudinal strengthening and stiffening rib or flange B at one side of which is the main blade A and at the other side a supplementary blade $A^2$, the latter having saw teeth D at its edge.

It will be understood that file teeth of any desired kind on one or both sides of the tool, and on one or both of its blades, or saw teeth on one or both longitudinal edges of the tool, or both file and saw teeth, may be provided by impressing, striking or cutting them in well known way.

From the foregoing description it will be seen that not only is the tool strengthened and its bending prevented by providing it with the rib or flange, but that the rib or flange serves as a stop or guide to limit or control the filing action or depth of cut of the tool. For instance, in dental operations, when the tool is used to cut or abrade between teeth, the flange or rib coming in contact with the crown of the tooth being operated upon or with the crown of the tooth next thereto, the tool will be controlled in its operation so that the depth of penetration of the tool cannot exceed the width of the blade or rib in action, and these may be varied in width as desired.

The tools may be made of any desired dimensions to suit them for use for varying purposes for which they may be suitable.

My invention for some purposes may be modified by dispensing with the file teeth and securing upon the metal surface suitable abrasive material while still retaining the advantages resulting from the provision of the rib or flange.

I claim as my invention—

The sheet metal abrading or cutting tool having the main and supplemental blades with the rib or flange between them and integral therewith and serving to limit the action of either blade and strengthen or stiffen the tool substantially as set forth.

In testimony whereof I affix my signature in presence of two witnesses.

WOODBURY STORER HOW.

Witnesses:
 EDW. F. SIMPSON, Jr.,
 R. DALE SPARHAWK.